United States Patent
Hagel et al.

(10) Patent No.: US 8,200,415 B2
(45) Date of Patent: Jun. 12, 2012

(54) METHOD AND DEVICE FOR CONTROLLING THE OPERATING MODE OF AN INTERNAL COMBUSTION ENGINE

(75) Inventors: Reinhold Hagel, Pinzberg (DE); Mehmet Tuna, Fuerth (DE); Emmanuel Routier, Stuttgart (DE); Kayhan Goeney, Esslingen (DE)

(73) Assignee: Conti Temic microelectronic GmbH, Nuernberg (DE)

( * ) Notice: Subject to any disclaimer, the term of this patent is extended or adjusted under 35 U.S.C. 154(b) by 655 days.

(21) Appl. No.: 12/312,535

(22) PCT Filed: Nov. 28, 2007

(86) PCT No.: PCT/DE2007/002147
§ 371 (c)(1),
(2), (4) Date: May 13, 2009

(87) PCT Pub. No.: WO2008/064659
PCT Pub. Date: Jun. 5, 2008

(65) Prior Publication Data
US 2010/0063711 A1 Mar. 11, 2010

(30) Foreign Application Priority Data
Dec. 1, 2006 (DE) .......... 10 2006 056 860

(51) Int. Cl.
*G06F 19/00* (2011.01)
*G06F 11/30* (2006.01)
*G01M 15/11* (2006.01)
*H03F 1/26* (2006.01)
*F02D 41/22* (2006.01)

(52) U.S. Cl. ........ 701/111; 701/104; 123/435; 123/481; 73/114.16; 702/185; 702/189; 702/198

(58) Field of Classification Search ............. 123/406.13, 123/406.24, 406.45, 406.47, 435, 436, 481; 123/198 F; 701/101–105, 110, 111, 114, 701/115; 73/114.02, 114.06, 114.16, 114.17, 73/198; 702/182, 183, 185, 189
See application file for complete search history.

(56) References Cited

U.S. PATENT DOCUMENTS
4,513,714 A 4/1985 Dolenc et al.
(Continued)

FOREIGN PATENT DOCUMENTS
DE 42 21 891 1/1994
(Continued)

OTHER PUBLICATIONS

A. L. Lattka et al., "Application of the Hartley transform in monitoring and diagnosis of machines", 8129 AT Automatisierungstechnik; vol. 37, No. 9, Oldenbourg Verlag; Munich, Federal Republic of Germany; Sep. 1989. pp. 349-354, XP000066109, ISSN: 0718-2312, with English Abstract.

(Continued)

Primary Examiner — Willis Wolfe, Jr.
(74) Attorney, Agent, or Firm — W. F. Fasse (57) ABSTRACT

The invention relates to a method for controlling the operating mode of an internal combustion engine (1) comprising several cylinders (3) and an injection system (4) with one injection unit (5) per cylinder (3). According to said method: a digital measuring signal, which characterizes the combustion of fuel (6) in the internal combustion engine (1), is first determined; said digital measuring signal is then transformed into a frequency range; a misfiring of the ignition is detected using the amplitude information of the transformed measuring signal and if a misfiring has occurred, the injection of the individual cylinders (3) is deactivated sequentially for a predefined period and for each cylinder the corresponding digital measuring signal that characterizes said cylinder is determined and transformed into the frequency range and a misfiring cylinder (3) is identified during the evaluation of the transformed measuring signal using the amplitude information. The invention also relates to a device for controlling the operating mode of an internal combustion engine (1) using a method of this type.

2 Claims, 3 Drawing Sheets

U.S. PATENT DOCUMENTS

| | | | |
|---|---|---|---|
| 4,932,379 A * | 6/1990 | Tang et al. | 123/436 |
| 5,239,473 A | 8/1993 | Ribbens et al. | |
| 5,241,480 A | 8/1993 | Takaku et al. | |
| 5,303,158 A | 4/1994 | Kuroda | |
| 5,334,938 A * | 8/1994 | Kugler et al. | 701/111 |
| 5,392,642 A | 2/1995 | Tao | |
| 5,428,991 A | 7/1995 | Klenk et al. | |
| 5,479,818 A | 1/1996 | Walter et al. | |
| 5,691,469 A | 11/1997 | Mezger et al. | |
| 5,909,724 A | 6/1999 | Nishimura et al. | |
| 5,934,256 A | 8/1999 | Wenzlawski et al. | |
| 6,021,758 A | 2/2000 | Carey et al. | |
| 6,286,482 B1 | 9/2001 | Flynn et al. | |
| 6,318,152 B1 | 11/2001 | Hagihara et al. | |
| 6,357,287 B1 | 3/2002 | Jin | |
| 6,665,607 B2 | 12/2003 | Skala et al. | |
| 6,732,708 B2 * | 5/2004 | Nishizawa et al. | 123/406.13 |
| 6,820,593 B2 | 11/2004 | Remele et al. | |
| 6,834,640 B2 * | 12/2004 | Nishizawa et al. | 123/406.13 |
| 7,219,003 B2 | 5/2007 | Hagel et al. | |
| 7,516,732 B2 | 4/2009 | Hagel et al. | |
| 2002/0148441 A1 | 10/2002 | Tuken | |
| 2005/0229904 A1* | 10/2005 | Hagel et al. | 701/111 |
| 2008/0127945 A1 | 6/2008 | Hagel et al. | |

FOREIGN PATENT DOCUMENTS

| | | | |
|---|---|---|---|
| DE | 44 13 473 | 10/1995 | |
| DE | 196 22 042 | 12/1997 | |
| DE | 199 62 799 | 2/2001 | |
| DE | 102 35 665 | 2/2004 | |
| DE | 102004005325 | 8/2005 | |
| DE | 102004005328 | 9/2005 | |
| EP | 0 799 983 | 10/1997 | |
| GB | 2 331 153 | 5/1999 | |
| JP | 04276153 A * | 10/1992 | 701/111 |
| WO | WO 99/44028 | 9/1999 | |
| WO | WO 02/38936 | 5/2002 | |
| WO | WO 2004/016930 | 2/2004 | |

OTHER PUBLICATIONS

International Preliminary Report on Patentability for Application No. PCT/DE2007/002147, dated Jun. 11, 2009, 8 pages, International Bureau of WIPO, Geneva, Switzerland, and 3 pages partial English translation thereof.

* cited by examiner

METHOD AND DEVICE FOR CONTROLLING THE OPERATING MODE OF AN INTERNAL COMBUSTION ENGINE

The invention relates to a method and a device for controlling the operating mode of an internal combustion engine in accordance with the independent claims.

Internal combustion engines in motor vehicles comprise an injection system to inject fuel into the cylinders. The injection system comprises several injection units, which are each associated to a cylinder. A control unit predefines for the injection units an injection duration, during which an injection of fuel into the cylinders is effected, the control unit being also able to completely deactivate individual injection units.

Due to the occurrence of ignition misfirings, inevitable with an internal combustion engine, in the respective cylinder no combustion of the injected fuel-air mixture taking place, undesirably unburned fuel can reach the environment. Moreover, this can cause also a durable damage of exhaust gases after-treatment systems, for example of the catalyst, present with modern motor vehicles. Both result in that the vehicle exhaust emission of the environment is increased. In order to avoid this as far as possible there are national and international regulations and laws (e.g. OBD II, E-OBD), which prescribe among other things a device for recognizing ignition misfirings with motor vehicles.

From DE 199 62 799 A1 a system and a method are known for detecting misfirings in internal combustion engines. Here, a measuring signal characterizing the combustion is detected and subsequently subjected to the evaluation of a frequency analysis. It concerns, however, an exclusive misfiring recognition aiming at reducing storage losses of a computer located on board of a vehicle and to shorten the time for processing routines for detecting misfirings. It does not disclose a system, which makes it possible to identify that or the misfiring cylinders after the recognition of an ignition misfiring.

It is, therefore, the object of the invention to create a method of the type mentioned above which allows for a simple, quick and reliable recognition of ignition misfirings and a subsequent cylinder identification during the operation of an internal combustion engine.

This object is solved according to invention by a method with the features of claim 1. The core of the invention consists of the fact that a digital measuring signal, which characterizes the combustion of fuel in a cylinder, is determined; the digital measuring signal is then transformed for evaluation into a frequency range and a general misfiring of the ignition is detected using the amplitude information of the evaluated transformed measuring signal. For the subsequent cylinder identification, the injection of each cylinder is sequentially deactivated for a predefined period. In this period the corresponding digital measuring signal that characterizes the combustion is determined and is transformed for evaluation into the frequency range. If the evaluation of the transformed measuring signal results in that when comparing with the amplitude information n/2nd order from the preceding general misfiring recognition there is a change without an injection unit having been deactivated, then the examined cylinder cannot be a misfiring cylinder. The injection unit of the examined cylinder is re-activated. The steps are repeated for all cylinders. If there is no change in the amplitude information n/2nd order, then the examined cylinder is a misfiring cylinder to be identified. The method is applicable both with self-igniting and with non-self-igniting internal combustion engines.

Determining of the measuring signal according to claim 2 is simple and inexpensive. A sensor wheel for determining a speed measuring signal is usually present with an internal combustion engine, so that no additional measuring units are required for implementing the method according to the invention.

Transforming the digital measuring signal according to claim 3 enables a particularly simple and reliable evaluation of the measuring signal.

The discrete Hartley transform can be calculated exclusively by real operations. The measuring signal is decomposed into individual angular frequencies, which are also referred to as orders. Contrary to an evaluation of the measuring signal in the time region with the discrete Hartley transform higher-frequency interference portions in the measuring signal are automatically eliminated, since one can do without this calculation in principle when using the discrete Hartley transform.

Evaluating the transformed measuring signal according to claim 4 is less intensive in calculation. The spectral analysis of low-frequency spectral portions allows for a simple evaluation, without having to consider higher-frequency spectral portions superimposed with interference portions.

Evaluating the transformed measuring signal according to claim 5 is particularly simple. The amplitude of the spectral portion of 0.5th order is usually sufficient to detect a misfiring of the ignition.

Evaluating the transformed measuring signal according to claim 6 increases the reliability of the method.

Evaluating the transformed measuring signal according to claim 7 allows for a simple and reliable detection of the stable combustion, the reliability being adjustable by means of the predefined threshold value.

An averaging of the digital measuring signal according to claim 8 enables the elimination of cyclic fluctuations of the measuring signal, which are caused by an uneven combustion. Preferably, an arithmetic average value of the digital measuring signal is formed over at least two work cycles of the internal combustion engine.

A drag correction according to claim 9 allows for a correction of faults based on parasitic effects, such as for example based on mass moments of the internal combustion engine. For this purpose the internal combustion engine is advantageously dragged to a test stand, i.e. is operated without injection, the measuring signal being determined, transformed and evaluated without the influence of a combustion. The evaluation of the measuring signal provides at least one correction value, which is stored in a control unit and is taken into consideration when evaluating the transformed measuring signal.

A method according to claim 10 allows for a simple correction of measuring faults of the sensor wheel. The correction could also take place after transformation of the speed measuring signal.

An device for implementing the method for controlling the operating mode of an internal combustion engine according to claim 11 allows for a simple, quick and reliable detection of misfirings and a subsequent identification of the at least one misfiring cylinder. The advantages of the device correspond to those, which were explained above in connection with the method according to invention.

The device comprises at least one control unit for actuating at least one injection unit associated to a cylinder, the control unit being also able to completely deactivate the injection unit for a predefined period. Furthermore, the device comprises at least one measuring unit for determining a digital measuring signal, which characterizes the combustion of fuel in at least one cylinder, preferably the speed signal detected by a sensor wheel arranged at the crankshaft of the internal combustion engine.

In the at least one transformation unit of the device transformation of the digital measuring signal into a frequency range takes place. The evaluation of the amplitude information of the transformed measuring signal is effected in the at least one evaluation unit of the device. If in the evaluation unit a misfiring of the ignition in the internal combustion engine is detected, the control unit is instructed via an interface to deactivate successively in each individual cylinder the injection for a specified time. If in the evaluation unit a deviation from the transformed measuring signal without deactivation of the injection is determined, the control unit is instructed to re-activate the injection unit of the cylinder and to deactivate the injection unit of the next cylinder. These steps are repeated for all cylinders. As soon as in the evaluation unit no deviation from the transformed measuring signal without deactivation of the injection is determined, that cylinder, whose injection unit is currently deactivated, is identified as a misfiring cylinder. It can also occur that the combustion is misfiring in more than one cylinder. In particular, the injection of the misfiring cylinders is deactivated to avoid unburned fuel from being discharged.

Further advantages and features of the invention will become apparent from the following description of an example of embodiment of the invention on the basis of the drawing, in which.

Figure 1:
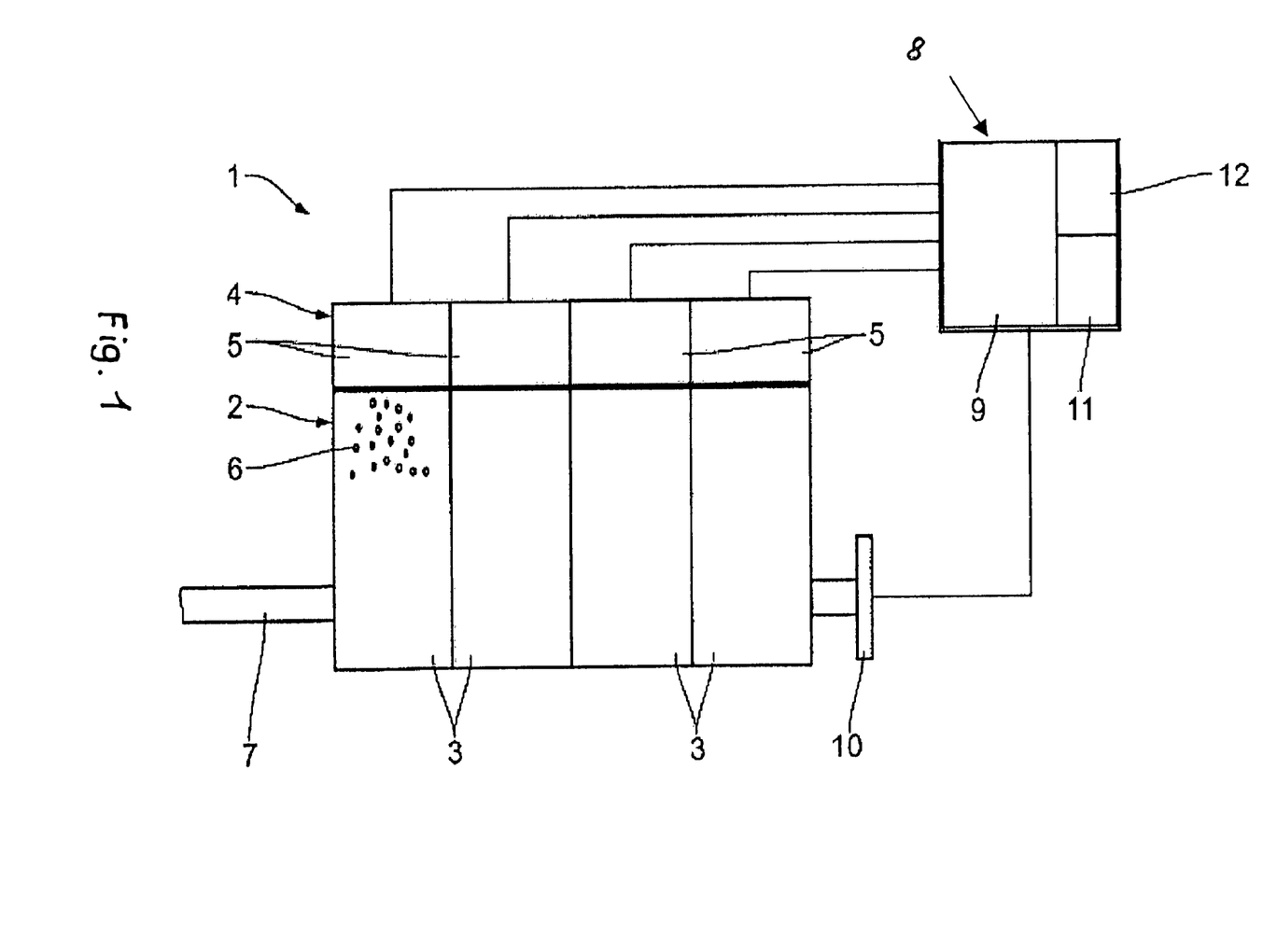
FIG. 1 shows a principle representation of an internal combustion engine with a device for controlling the operating mode of the internal combustion engine.

The internal combustion engine 1 in FIG. 1 comprises an engine block 2 with several cylinders 3 and an injection system 4. The injection system 4 comprises a number of injection units 5 corresponding to the number of cylinders 3, an injection unit 5 being associated to each cylinder 3 for the injection of fuel 6. A crankshaft 7 is arranged within the engine block 2 and protrudes therefrom. To convert the energy released in the cylinders 3 of the fuel 6 into a rotational movement, the crankshaft 7 is connected with cylinder pistons not shown in detail.

The injection system 4 comprises further a device 8 for controlling the operating mode of the internal combustion engine 1. The device 8 comprises a control unit 9 for actuating the injection units 5 by means of a predeterminable injection duration value, a measuring unit 10 for measuring a digital measuring signal, which characterizes the combustion of the fuel 6 in the cylinders 3, a transformation unit 11 for transforming the measuring signal into a frequency range and an evaluation unit 12 for evaluating the transformed measuring signal. The measuring unit 10 is arranged at a protruded end of the crankshaft 7 and is signal connected to the control unit 9. The measuring unit 10 is formed as a sensor wheel and comprises equidistant angular markings for determining a speed measuring signal of the crankshaft 7. The evaluation unit 12 is embodied in such a manner that an ignition misfiring in the internal combustion engine 1 can be detected. The control unit 9 is signal connected to the injection units 5 to predetermine injection duration values and/or to activate and deactivate the injection.

The occurrence of ignition misfirings leads to changes of torque, which reflect for example in the current crankshaft speed and/or in the current crankshaft acceleration.

By means of the method according to the invention described hereinafter in FIG. 2 it is possible in case of an internal combustion engine with n cylinders 3 to detect a misfiring of the ignition on the basis of a speed signal. Furthermore, it is possible, as is described in FIG. 3, to recognize in which cylinders 3 the ignition misfirings occur. For this purpose, the speed signal is transformed into the angular-frequency-range. As the displacement of individual cylinders particularly affects the low-frequency spectral portions, above all these are used to detect ignition misfirings.

By means of the measuring unit 10 formed as a sensor wheel the speed measuring signal of the crankshaft 7 is determined. The periods between the individual angular markings of the rotating sensor wheel 10 are detected by the sensor and are supplied to the control unit 9. The control unit 9 converts the measured periods into the digital speed measuring signal.

Figure 2:
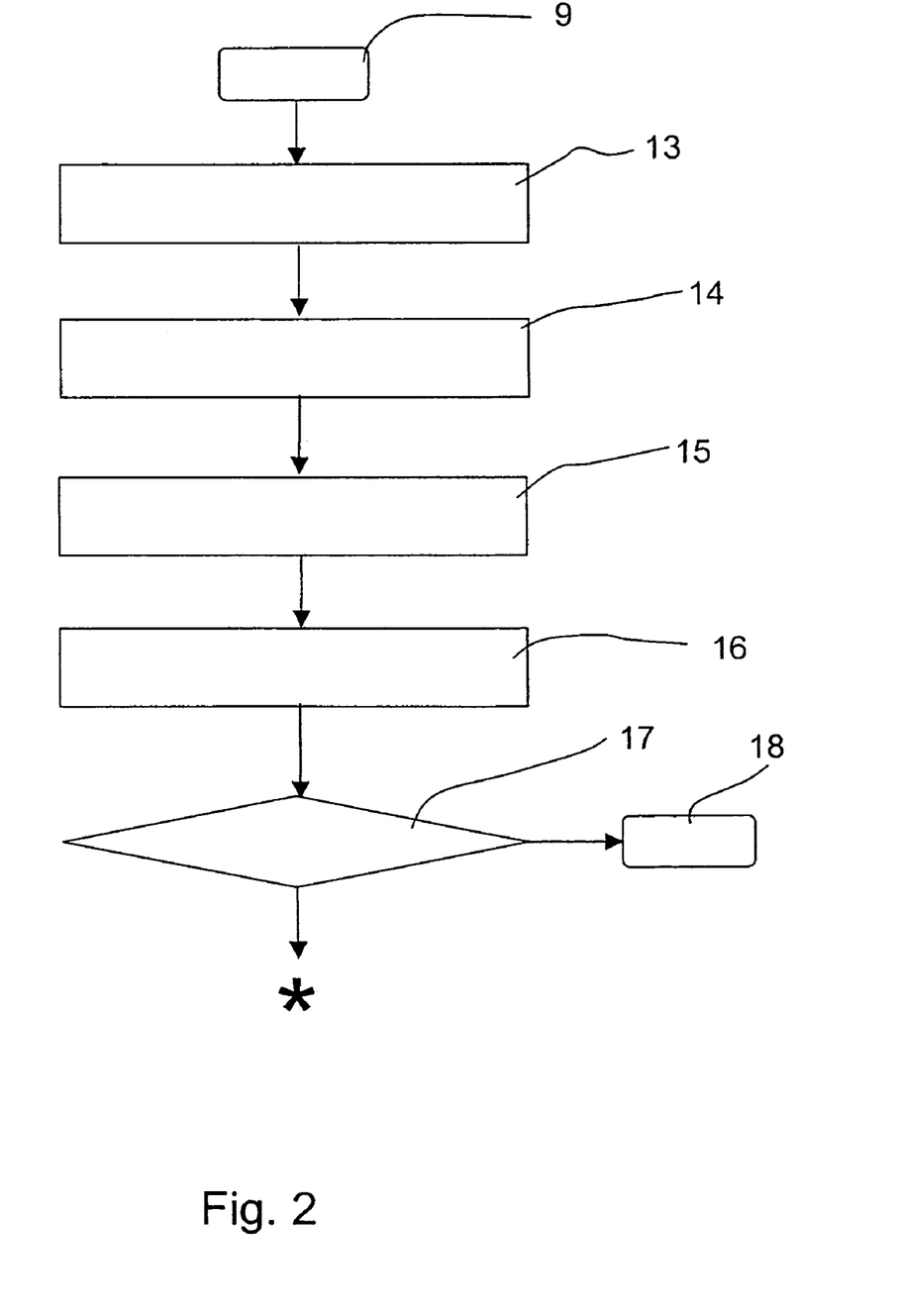
FIG. 2 shows a schematic representation of a method for recognizing a misfiring of the ignition.

At the beginning of the method according to FIG. 2 the speed measuring signal is first supplied to the first correction element 13, which performs an adaption of the sensor wheel to correct the measurement errors of the sensor wheel. For this purpose, the sensor wheel, in particular the distances of the angular markings, was measured at a test stand and correction values for non-equidistantly arranged angular markings were determined.

The corrected speed measuring signal is then supplied to the averaging element 14, which preferably forms an arithmetical mean value over two work cycles of the internal combustion engine 1 of the speed measuring signal. For this purpose, speed measuring signal values corresponding to each other are averaged in the work cycles. A speed segment of 720° of the crankshaft 7 is designated as a work cycle. The averaging serves to eliminate cyclic fluctuations, which are caused by an uneven combustion.

The averaged speed measuring signal is supplied to the transformation element 15 of the transformation unit 11, which transforms the speed measuring signal by means of a discrete Hartley transform into an angular frequency range. The discrete Hartley transform can be calculated exclusively by means of real operations, so that the transformation can be performed in quick and simple manner. By means of the discrete Hartley transform the speed measuring signal is decomposed in individual angular frequencies, which are referred to as spectral portions of a certain order. Due to the fact that the combustion of fuel 6 in the cylinders 3 has mainly effects in the low-frequency spectral portions of the speed measuring signal, one can do without the calculation and evaluation of higher-frequency spectral portions of the speed measuring signal. The individual spectral portions are characterized by an amplitude and a phase, while for evaluating the speed measuring signal in particular the amplitude of the spectral portion of $0.5^{th}$ order is sufficient. The amplitude of the spectral portion of $0.5^{th}$ order is referred to in the following as $A_{0.5}$.

The speed measuring signal transformed into spectral portions is then supplied to the second correction element 16, which performs a drag correction for correcting faults based on parasitic effects, such as for example based on mass moments of the internal combustion engine 1. For this purpose, the internal combustion engine 1 was advantageously operated while being dragged to a test stand, i.e. without injection of fuel 6, and the pertaining speed measuring signal was determined. By means of the discrete Hartley transform speed-dependent correction values for correcting the spectral portions were determined and were stored in the control unit 9. These correction values are used in the second correction element 16 for correcting the transformed speed measuring signal.

The transformed and corrected speed measuring signal is then supplied to the evaluation element 17 of the evaluation unit 12. The evaluation of the speed measuring signal, in particular the detection of a misfiring of the ignition, is made preferably by means of the amplitude of the spectral portion of 0.5th order.

If a misfiring of the ignition occurs in one of the n cylinders 3 of the internal combustion engine 1, the amplitude A0.5 of the spectral portion of the 0.5th order is significantly increased when compared to the normal operating mode without ignition misfirings. When comparing A0.5 with a threshold value (S) stored in particular in the evaluation element 17 the misfiring of the ignition is suggested in at least one of the n cylinders 3 of the internal combustion engine 1, if this threshold value is exceeded. If the threshold value (S) is not exceeded, a signal is supplied to the stop element 18. The method for recognizing a misfiring of the ignition can subsequently be repeated with the previous steps in certain timed distances.

Figure 3:
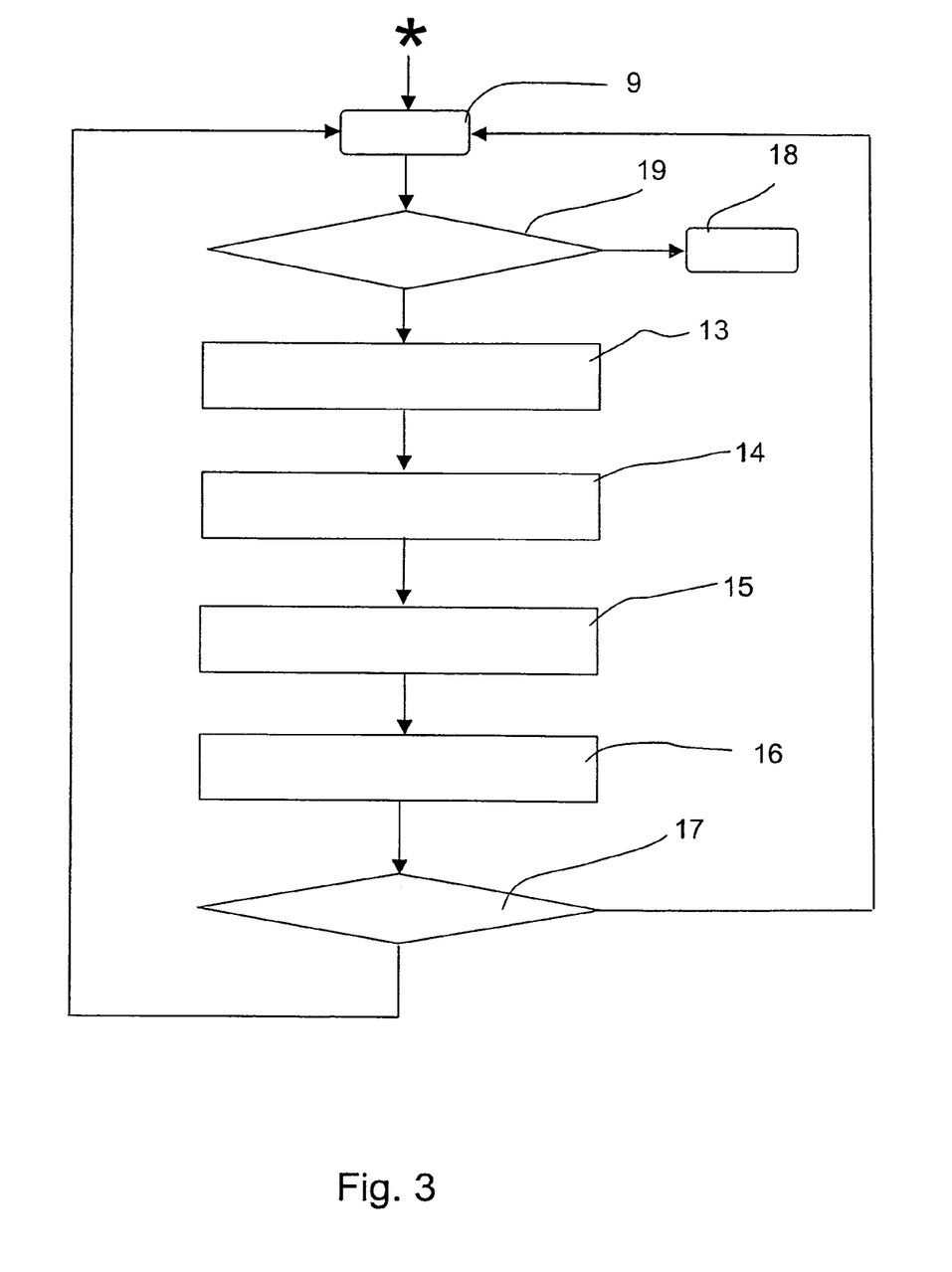
FIG. 3 shows a schematic representation of a method for cylinder identification, after a misfiring of the ignition was recognized.

If, based on the amplitude evaluation a misfiring of the ignition is detected, then it is proceeded for identifying the at least one misfiring cylinder as is shown in FIG. 3. Successively, beginning with the first cylinder, the following steps are performed n times in a loop. An initialization signal is sent to the control unit 9 from the evaluation element 17 from FIG. 2. If the examination in the query element 19, in particular a part of the control unit 9, results in that the number of the loops performed so far is <n, the control unit 9 sends a signal to the injection unit 5 of the first cylinder 3 and deactivates the latter for a predefined time. The deactivation takes at least one work cycle. During this period the steps from the preceding method for recognizing a misfiring of the ignition are performed in the evaluation element 17 starting with the determination of the speed measuring signal by means of the measuring unit 10 via the sensor wheel adaptation in the first correction element 13 up to the evaluation of the transformed and corrected speed measuring signal. If the amplitude of the spectral portion of n/2nd order deviates from the amplitude of the spectral portion of n/2nd order from the preceding method without deactivating the injection for recognizing a misfiring the ignition, then it is disclosed from this fact that the examined cylinder is not the at least one misfiring cylinder and an according signal is transmitted to the control unit 9.

If the determined amplitude of the spectral portion of n/2nd order does not deviate from the amplitude of the spectral portion of n/2nd order from the preceding method for recognizing a misfiring of the ignition, thus if no change in the combustion is found, irrespective of the fact whether the injection unit 5 of the examined cylinder 3 is activated or deactivated, then the examined cylinder 3 is identified as a misfiring cylinder. An appropriate signal 9 is transmitted to the control unit 9.

As soon as it is determined in the query element 19 that all n cylinders have been examined, a signal is released to the stop element 18. The injection units of the concerned cylinders remain deactivated, in order to prevent that unburnt fuel reaches the exhaust system. Preferably, the operator of the vehicle is advised of the misfiring of the ignition, for the example by a corresponding message on the instrument panel. If the vehicle comprises a corresponding device, also a message can be sent to a workshop. The method can also be used as a diagnostic method in a workshop.

For saving computer time and computer capacity, it is conceivable, in the methods described in FIG. 2 and FIG. 3 to omit the correction elements 13, 16 and the averaging element 14 either individually or completely. In this case, however, the method would get more inaccurate.

In the aforementioned examples of embodiment the sensor wheel adaptation in the correction element 13 and the averaging over several work cycles in the averaging element 14 were performed before the transformation of the speed measuring signal in the transformation element 15. Both the sensor wheel adaptation and the averaging could also take place in particular after the transformation.

The aforementioned examples of embodiment of the invention were described on the basis of the Hartley transform. However, with an appropriate modification, the invention can be applied also with the aid of another transformation, for example a fast Fourier transform (FFT), a discrete Fourier transform (DFT) or the like, although the invention is most favorable and thus most suitable in case of a Hartley transform.

In the aforementioned examples of embodiment in each case an arithmetical averaging was effected. The invention should, however, not exclusively be restricted to it, but can be used also very advantageously with a geometric averaging or the like.

In summary, it can be determined that by the described method turning completely away from solutions known so far a reliable control of the operating mode of the internal combustion engine is realizable in a very elegant but nevertheless very simple manner.

The present invention was represented on the basis of the above description, such as to explain at best the principle of the invention and its practical application. However, the invention can be realized with an appropriate modification naturally in numerous other forms of embodiments.

LIST OF REFERENCE NUMERALS

1 Internal combustion engine
2 Engine block
3 Cylinder
4 Injection system
5 Injection unit
6 Fuel
7 Crankshaft
8 Device
9 Control unit
10 Measuring unit
11 Transformation unit
12 Evaluation unit
13 Correction element, first
14 Averaging element
15 Transformation element
16 Correction element, second
17 Evaluation element
18 Stop element
19 Query element

The invention claimed is:
1. A method for controlling the operating mode of an internal combustion engine (1) with n cylinders (3) and an injection system (4) with an injection unit (5) per cylinder (3), with the steps:
   a) determination of a digital measuring signal which characterizes the combustion of fuel (6) in the internal combustion engine (1),
   b) transformation of the digital measuring signal into a frequency range, c) evaluation of the transformed measuring signal, a misfiring of the ignition being detected using the amplitude information of the transformed measuring signal, and if a misfiring of the ignition is detected e) sequential deactivation of the injection of each individual of the n cylinders (3) for a predefined time, and repetition of the steps a) to c) for each of the n cylinders (3), wherein using the amplitude information $n/2^{nd}$ order of the transformed measuring signal a misfiring cylinder (3) is identified.

2. A method according to claim 1, characterized in that the digital measuring signal is a speed measuring signal determined by means of a sensor wheel (10).

* * * * *

UNITED STATES PATENT AND TRADEMARK OFFICE
CERTIFICATE OF CORRECTION

Page 1 of 2

PATENT NO. : 8,200,415 B2
APPLICATION NO. : 12/312535
DATED : June 12, 2012
INVENTOR(S) : Reinhold Hagel et al.

It is certified that error appears in the above-identified patent and that said Letters Patent is hereby corrected as shown below:

Title page,
Bottom of right column, "2 Claims" should be --11 Claims--;

Column 8,
Following Line 6, please insert:
--3. A method according to claim 1, characterized in that the transformation of the digital measuring signal is carried out by a discrete Hartley transformation.
4. A method according to claim 1, characterized in that the evaluation of the transformed measuring signal according to step c) is carried out by a spectral analysis of low-frequency spectral portions of the transformed measuring signal.
5. A method according to claim 4, characterized in that the evaluation of the transformed measuring signal according to step c) is carried out with respect to the amplitude of the spectral portion of $0.5^{th}$ order.
6. A method according to claim 4, characterized in that the evaluation of the transformed measuring signal according to step c) is carried out with respect to a linear combination of amplitudes of low-frequency spectral portions of the transformed measuring signal.
7. A method according to claim 1, characterized in that the evaluation of the transformed measuring signal according to step c) comprises at least a comparison of a spectral portion of the transformed measuring signal with a threshold value (S) characterizing an ignition misfiring.

Signed and Sealed this
Fifth Day of February, 2013

Teresa Stanek Rea
*Acting Director of the United States Patent and Trademark Office*

(CONTINUED from prior page)

8. A method according to claim 1, characterized in that the digital measuring signal is averaged before the evaluation according to step c) or e) over at least two work cycles of the internal combustion engine (1).

9. A method according to claim 1, characterized in that before the evaluation of the transformed measuring signal according to step c) or e), a drag correction for correcting faults is provided.

10. A method according to claim 2, characterized in that before the evaluation of the speed measuring signal according to step c) or e), a sensor wheel adaptation for correcting measuring faults of the sensor wheel (10) is provided.

11. A device for control of an operating mode of an internal combustion engine (1) by a method according to claim 1, at least comprising:
    - a control unit (9),
    - a measuring unit (10),
    - a transformation unit (11), and
    - an evaluation unit (12).--